United States Patent
Long et al.

(10) Patent No.: US 9,532,505 B2
(45) Date of Patent: Jan. 3, 2017

(54) HOOD DIVIDER ADJUSTMENT APPARATUS FOR AN AGRICULTURAL HARVESTER

(71) Applicant: CNH Industrial America LLC, New Holland, PA (US)

(72) Inventors: Zachary Long, Harleysville, PA (US); Andrew V. Lauwers, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 9 days.

(21) Appl. No.: 14/582,441

(22) Filed: Dec. 24, 2014

(65) Prior Publication Data

US 2016/0183466 A1   Jun. 30, 2016

(51) Int. Cl.
| | | |
|---|---|---|
| *A01D 45/02* | (2006.01) | |
| *A01D 57/22* | (2006.01) | |
| *A01D 63/04* | (2006.01) | |

(52) U.S. Cl.
CPC ............ *A01D 57/22* (2013.01); *A01D 45/021* (2013.01); *A01D 63/04* (2013.01)

(58) Field of Classification Search
CPC ...... A01D 45/021; A01D 41/06; A01D 57/22; A01D 63/04
USPC ............................ 56/319, 119, 314; 460/18.2
See application file for complete search history.

(56) References Cited

U.S. PATENT DOCUMENTS

| | | | | |
|---|---|---|---|---|
| 2,284,909 A | * | 6/1942 | Kuhlman | A01D 45/028 56/119 |
| 2,534,481 A | * | 12/1950 | Spraker | A01D 45/021 56/119 |
| 3,967,439 A | | 7/1976 | Mott | |
| 4,538,404 A | * | 9/1985 | Heimark, Jr. | A01D 45/021 56/119 |
| 4,757,673 A | * | 7/1988 | Gayman | A01D 63/04 172/502 |
| 5,865,019 A | | 2/1999 | Hurlburt et al. | |
| 6,247,297 B1 | | 6/2001 | Becker | |
| 6,513,313 B1 | | 2/2003 | Bennett | |
| 8,141,331 B2 | | 3/2012 | Bich et al. | |
| 9,253,944 B2 | * | 2/2016 | Hulstein | A01D 45/021 |
| 2014/0130474 A1 | | 5/2014 | Hulstein et al. | |

* cited by examiner

*Primary Examiner* — John G Weiss
(74) *Attorney, Agent, or Firm* — Peter K. Zacharias; Patrick M. Sheldrake

(57) ABSTRACT

A row divider of an agricultural harvester is disclosed. The row divider includes a hood, a divider and an adjustment apparatus for adjusting the position of the divider and hood relative to each other. The adjustment apparatus includes a divider support extending from the hood for supporting the divider and an adjustment assembly. The adjustment assembly is connected to the divider support and extends through the hood to an outer region of the hood such that an operator can access and adjust the position of the divider from a region outside the hood and/or divider without the need for lifting the divider to an up position.

20 Claims, 9 Drawing Sheets

HOOD DIVIDER ADJUSTMENT APPARATUS FOR AN AGRICULTURAL HARVESTER

BACKGROUND

The subject application relates generally to an apparatus for a header of an agricultural harvester, such as, but not limited to, a combine, windrower or the like. In particular, the subject application relates to a hood divider adjustment apparatus for an agricultural harvester.

An agricultural harvester i.e., a plant cutting mechanism, such as, but not limited to, a combine or a windrower, generally includes a header operable for severing and collecting or gathering plant or crop material as the machine is driven over a field. The header will have a plant cutting mechanism for severing the plants or crops, which can comprise, as a non-limiting example, an elongate sickle mechanism sidewardly reciprocatingly movable relative to a non-reciprocating guard structure or a row unit with gathering chains and deck plates. At each end of the plant cutting mechanism and possibly at other locations along the width thereof, the header will typically include a divider which projects forwardly of the cutting mechanism and which moves through the crop in advance thereof for separating those plants that will be cut from adjacent plants. For standing crops such as wheat and other grasses, the dividers are located some distance above the ground surface. For other grains, particularly legumes such as soybeans, the divider will be located very close to, on, or intermittently on, the ground, and will additionally function to lift and separate laid over crops, to divide those in front of the cutting mechanism that are to be cut, from those that have laid over into the path of the divider from the side.

Conventional divider support apparatuses are bulky and their adjustment mechanism is mounted below gathering chains of a header row unit. As a result, to access the divider support a user must go between the gathering chains. Further, to access the adjustment mechanism of the divider support apparatus, a user must raise the divider to an up position to access the adjustment mechanism. This limited access to the divider support's adjustment mechanism makes operation of the harvester more difficult when such dividers are to be adjusted during harvesting operations.

BRIEF SUMMARY

In accordance with a first aspect, the subject application provides a row divider of an agricultural harvester comprising a hood, a divider and an adjustment apparatus for adjusting the position of the divider and hood relative to each other. The adjustment apparatus includes a divider support for supporting the divider, and an adjustment assembly connected to the divider support and extending through the hood to an outer region of the hood. The adjustment assembly comprises an adjustment extending proud of an outer surface of the hood.

In accordance with a second aspect, the subject application provides a row divider of an agricultural harvester comprising a support structure and an adjustment assembly. The support structure supports a divider pivotably attached to the hood. The adjustment assembly is connected to the support structure and extends through the hood to a position about an outer surface of the hood for moving the divider between first and second positions.

In accordance with a third aspect, the subject application provides a method of adjusting a row divider of an agricultural harvester comprising the acts of providing an adjustment apparatus for adjusting a position of a divider and a hood relative to each other. The adjustment apparatus includes a divider support for supporting the divider, and an adjustment assembly connected to the divider support and extending through the hood to an outer region of the hood. The method further includes the act of adjusting the adjustment assembly from about the outer region of the hood.

According to another aspect, the subject application provides a hood mounted divider adjustment that will stay above the gathering chains of the row unit. The hood mounted divider adjustment is mounted off of the hood. This configuration raises the divider support structure from above the gathering chains.

To mount the divider adjustment a hole is molded into a "bonnet" section of the hood to allow a bolt to go from a top side of the ear dam to the bottom side. A structure would then be bolted to the bottom side of the hood that provides a rotation axis. This axis is where the divider support would be bolted and would be held in place by the bolt that goes through the ear dam. The divider support mechanism is mounted from the hood and entails a fine adjustment accessible from an outside of the hood that is able to be done with the divider in a down position.

The hood mounted divider advantageously provides a large weight savings by getting rid of the current divider support structure and incorporating it into the hood. The hood mounted divider further provides the ability to adjust the divider with the divider in the down position so the user can look down the divider points and make sure they are all level.

Moreover, the hood divider adjustment of the subject application advantageously allows for the use of common parts regardless of hood width. That is, the adjustment apparatus of the subject application is configured with an adjustment assembly and divider support that can be universally applied to a divider and hood independent of any dimensional width of the divider or hood. This is accomplished, in part, by an essentially single axised adjustment assembly that extends through the hood about its midplane region.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
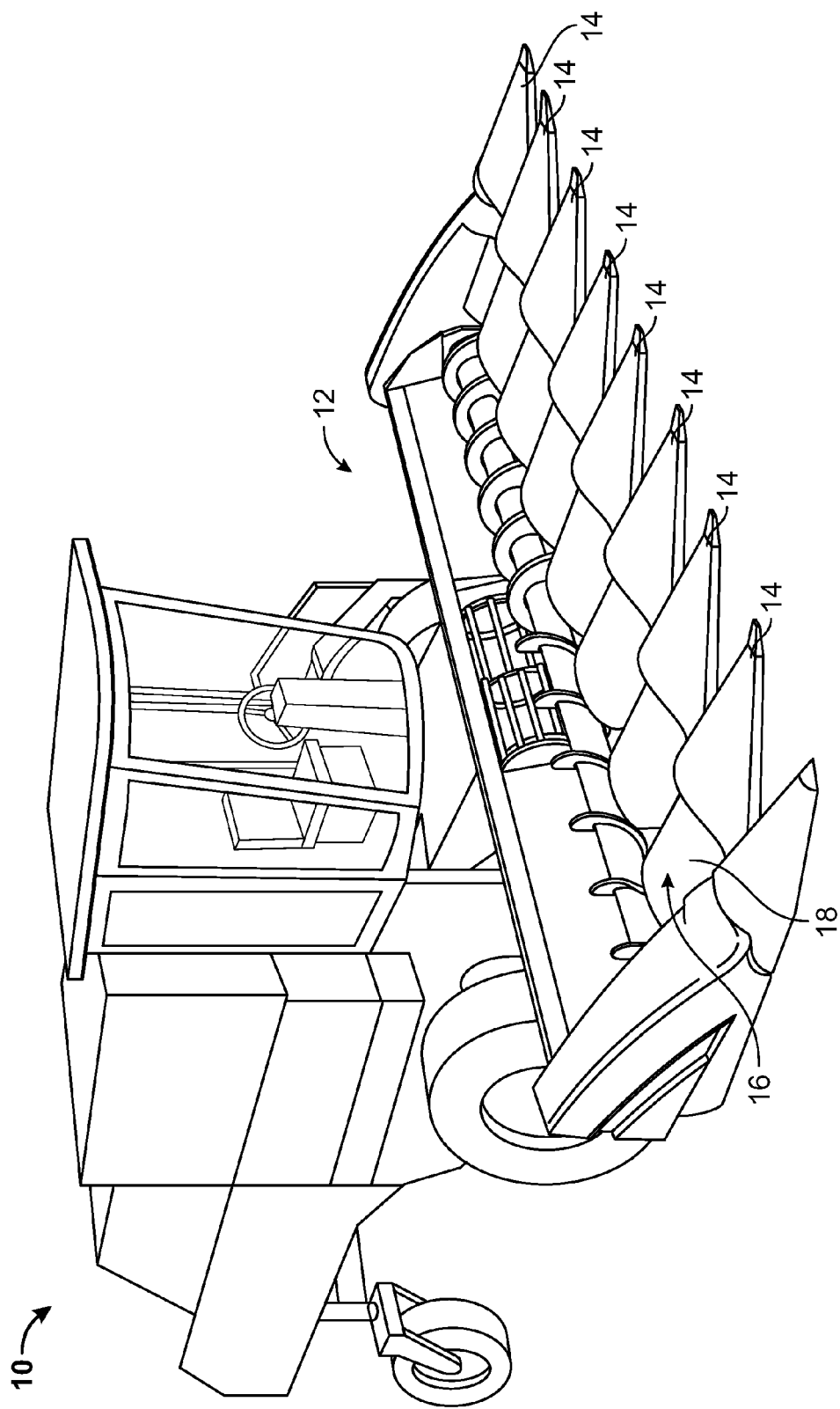
FIG. 1 is a perspective view of an agricultural harvester including a corn header applicable to the subject application.

Referring to FIG. 1, a self-propelled agricultural harvester (or combine) 10 is shown, including a header 12 with a plurality of dividers 14 mounted to respective row dividers 16 attached to a frame of the header. The header also includes a plurality of hoods 18 connected to respective dividers. For purposes of describing the subject application, and not by way of limitation, the divider 14 will be described with respect to a corn header row divider. The divider 14 has an overall wedge shape when viewed from the side. Divider 14 is disposed at the end of a cutting mechanism of header 12, for example a row unit but which can alternatively be a sickle type cutter including an elongate end-to-end array of knife sections reciprocatingly movable in a side-to-side direction for severing crops from a field as combine 10 is moved forwardly thereover. Header 12 additionally includes a conveyor arrangement operable for gathering the cut crops, and conveying them to a center region of header, and into a feeder of the combine 10, in the well-known manner.

It should be understood that it is contemplated that the apparatus of the subject application has utility for use for supporting and adjusting dividers of a wide variety of configurations, for a wide variety of headers, including for other plant cutting machines, such as windrowers and grain headers and therefore is not to be limited in scope of applicability to the associated apparatus shown. Agricultural harvester 10 is also of conventional construction and operation, for separating grain from the cut crops, collecting the grain, and discharging the material other than grain. For windrower applications, the agricultural harvester 10 would be replaced by a tractor. In grain headers, the grain header would include a grain head row divider which would be applicable to the aspects of the subject application.

Referring now to FIGS. 2-13, a first aspect of the subject application is shown. The row divider 16 includes the divider 14 and the hood 18. The divider 14 is pivotally connected to the hood by a pair of connections 20. The connections 20 allow the divider 14 to pivot upwardly and downwardly relative to the stationary hood 18 and an adjustment apparatus 32, further discussed below. The connections 20 also allow the divider to rotate downwardly relative to the stationary hood to a position limited by the position of the adjustment apparatus divider support 34, as further discussed below. The divider 14 is configured and shaped as best shown in FIGS. 1-7 and 11 having a substantially triangular shaped longitudinal cross-section and an overall hemi-cone-like shape.

Figure 11:
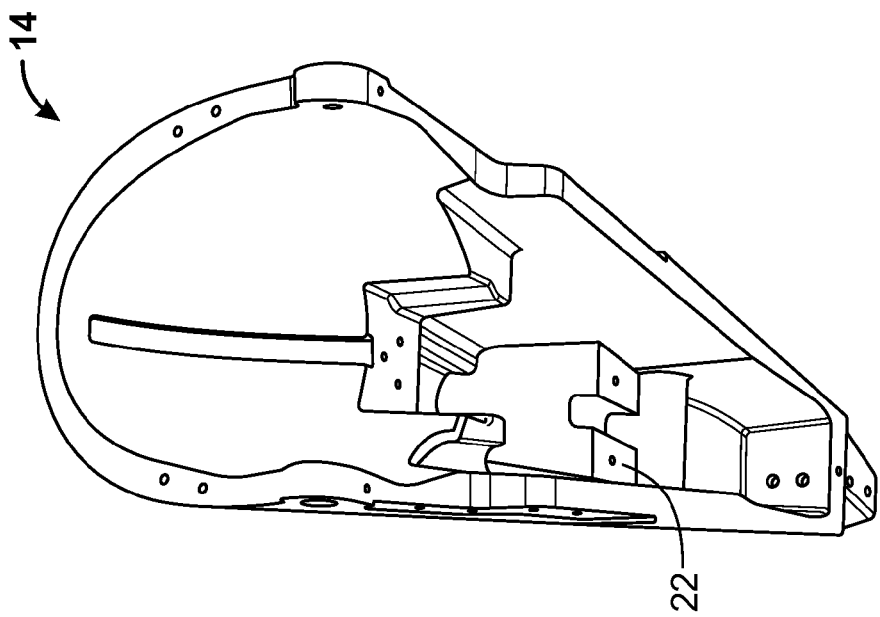
FIG. 11 is a bottom perspective view of a divider of the row divider of FIG. 2.
Figure 12:
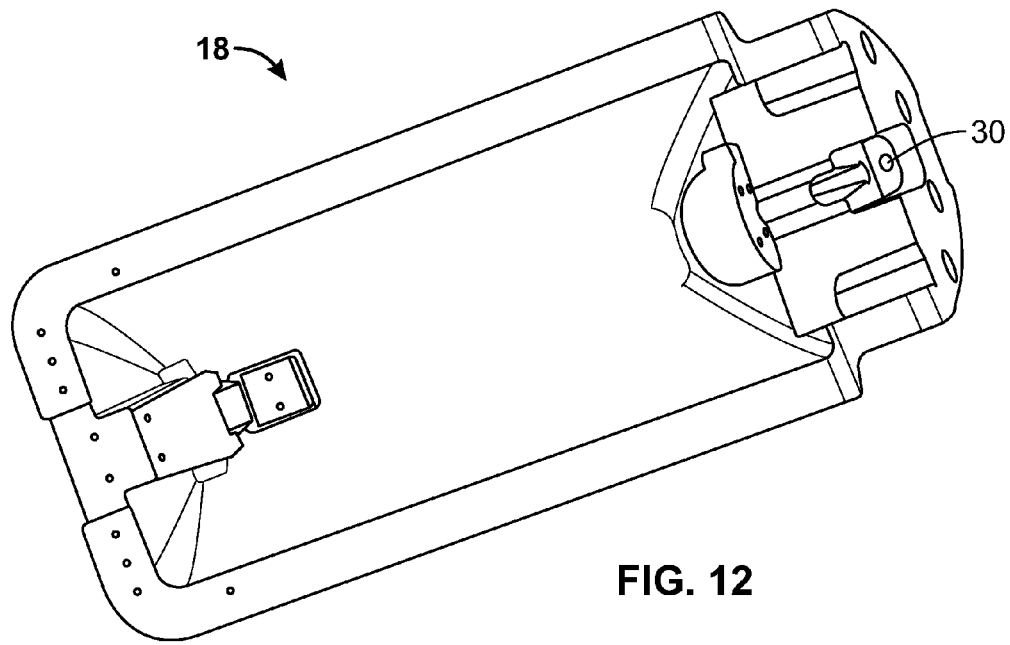
FIG. 12 is a bottom view of a hood of the row divider of FIG. 2.

The underside of the divider 14 is best shown in FIG. 11 and includes a support rest 22 for seating on a divider support or support structure 34, as further described below. The support rest 22 is positioned about a midpoint region of a longitudinal length of the divider 14 and has a substantially planar bottom surface.

Figure 6:
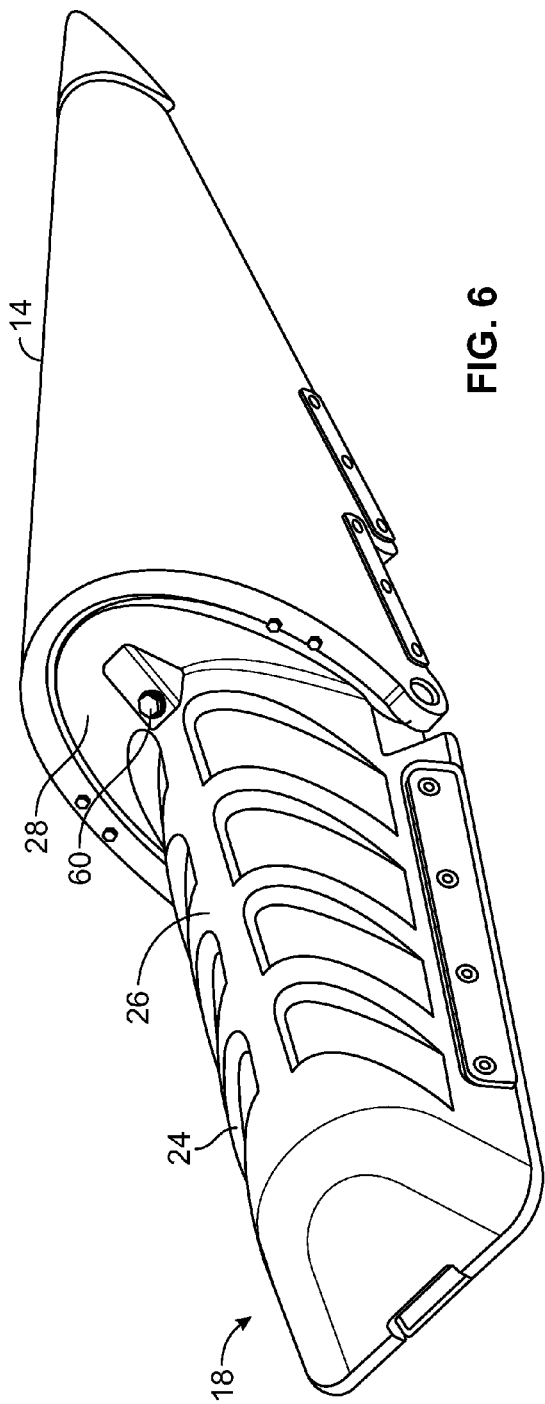
FIG. 6 is a perspective view of the row divider of FIG. 2.
Figure 7:
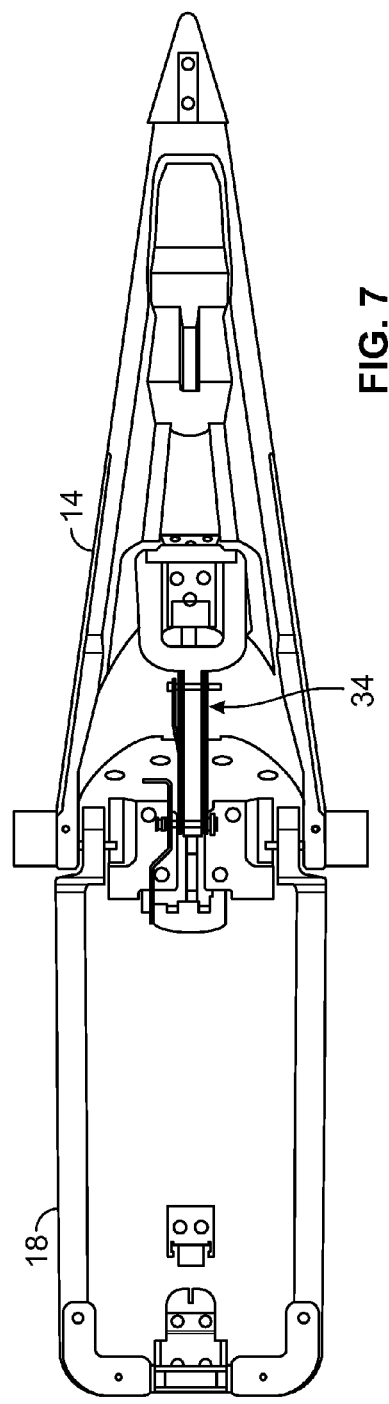
FIG. 7 is a bottom view of the row divider of FIG. 2.
Figure 13:
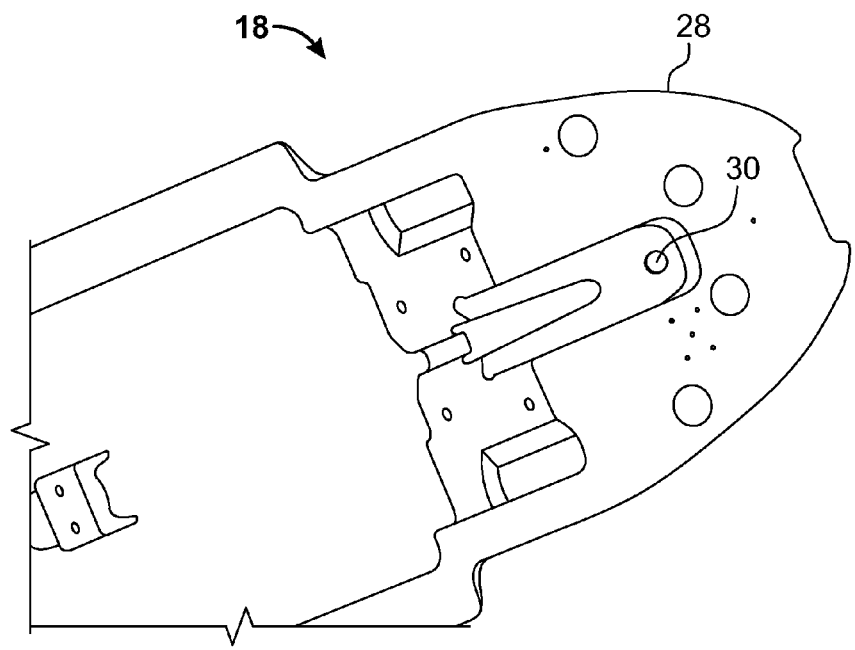
FIG. 13 is an enlarged prospective view of a front end of the hood of FIG. 12.

The hood 18 is configured as best shown in FIGS. 1-7, 12 and 13. The hood includes a main body portion 24 having a top surface 26, and a forward end 28 that extends forwardly and upwardly from the main body portion. The forward end 28 has an overall shape that is complementary to a rearward most end of the divider such that the forward end can seat therein when the divider is in the down position, as best shown in FIG. 6. The forward end also includes a through hole 30 (FIG. 13) that extends from a top end of the hood and completely therethrough, e.g., completely through the forward end 28. More specifically, the through hole 30 extends through the hood starting from a top end of the hood about the forward end 28 in a downwardly and forwardly direction. The top end of the through hole 30 starts on the forward end 28 at a position slightly spaced apart from the top surface 26 of the hood while the bottom end of the through hole terminates about a mid-region of the forward end, as best shown in FIG. 13.

The through hole 30 is sized and configured for receiving a portion of an adjustment assembly 36, as further described below. Specifically, the through hole 30 is sized and configured for receiving a fine adjustment 54 of the adjustment assembly 36.

The row divider 16 further includes an adjustment apparatus 32 for adjusting the position of the divider 14 and hood 18 relative to each other, as best shown in FIGS. 6-10. The adjustment apparatus 32 includes a divider support 34 for supporting the divider and an adjustment assembly 36.

The divider support 34 can e.g., extend from the hood 18 for supporting the divider 14. The divider support 34 has a first end 38 rigidly attached to the hood and a second end 40 opposite the first end configured for engaging the support rest 22 of the divider 14. That is, the divider support 34 is attached to the hood about its forward end 28 or adjacent the forward end 28 and extends forwardly such that the second end 40 is positioned in line with the support rest 22 of the divider. Of course, instead of extending from the hood, the divider support can alternatively be configured to extend from any part of the row unit or header frame.

In the present aspect, the divider support 34 includes a mounting bracket 42 for mounting to the hood and an extension arm 44 extending from the mounting bracket in a forwardly direction. About a forward most end of the extension arm 44 is a substantially U-shaped support 46. The U-shaped support 46 is sized and configured to allow support rest 22 of divider 14 to seat thereon.

The extension arm 44 is pivotably connected to the mounting bracket 42 while the U-shaped support 46 is rigidly attached to the extension arm. The extension arm 44 also includes a slot 48 for receiving and pivotably connecting to the adjustment assembly 36.

In addition to the foregoing description of the divider support, the divider support 34 can alternatively be configured in any manner sufficient to allow the first end 38 to be attached to the hood while the second end extends adjacent to the support rest 22 of the divider 14 when the divider is in a down position. Alternatively, the divider support can be attached to something other than the hood, e.g., a part of the header frame or the row unit frame, either fixedly or pivotably. Additionally, the divider support can include a frame member 50 to aid and mounting the divider support to the hood.

Figure 8:
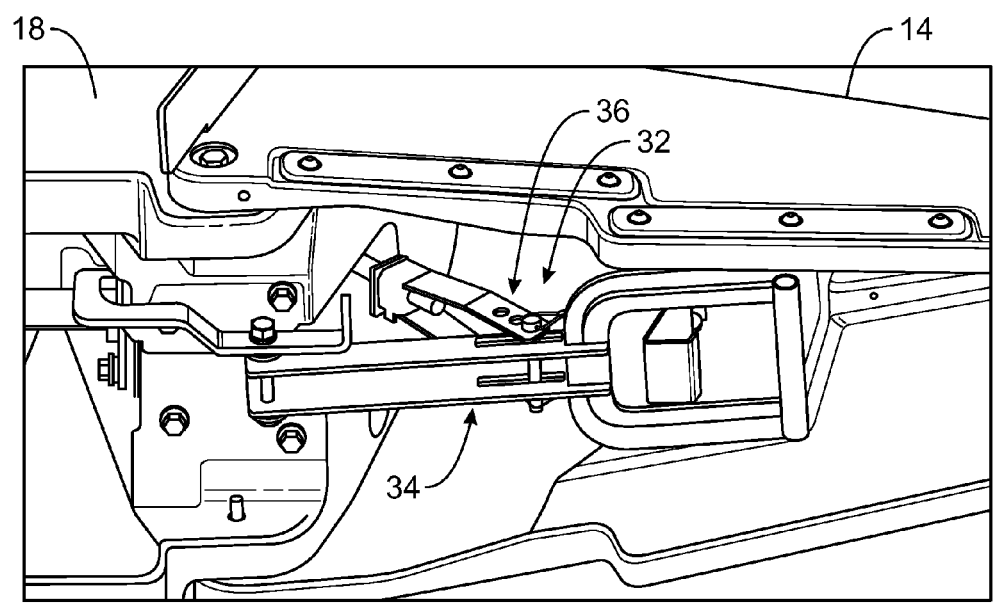
FIG. 8 is an enlarged bottom perspective view of the row divider of FIG. 2.
Figure 9:
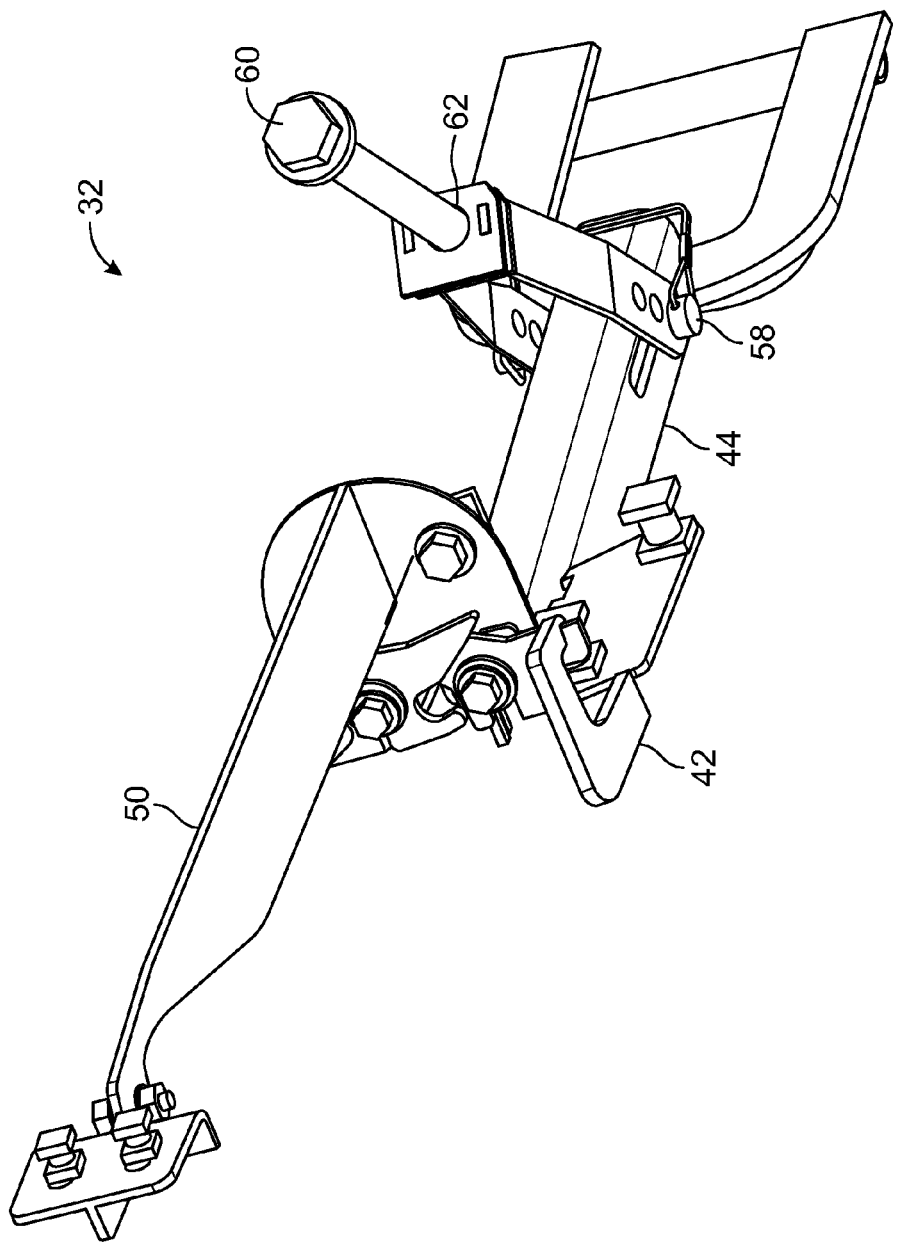
FIG. 9 is a top perspective view of an adjustment apparatus of the row divider of FIG. 2 in accordance with the subject application.
Figure 10:
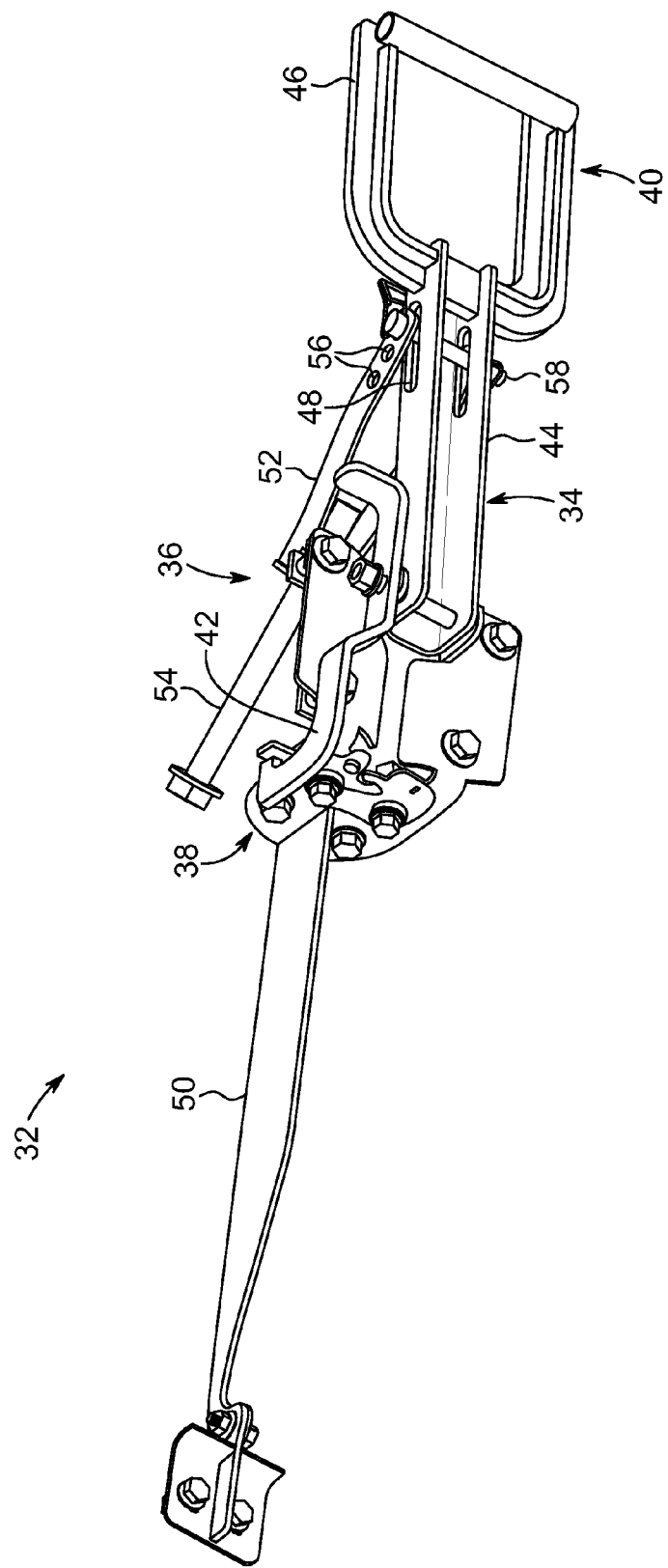
FIG. 10 is a bottom perspective view of the adjustment apparatus of FIG. 9.

The adjustment assembly 36 is configured, as best shown in FIGS. 6-10. As shown in the combination of FIGS. 6 and 8, the adjustment assembly 36 is connected to the divider support 34 and extends through the hood 18 to an outer region of the hood through the through hole 30. The adjustment assembly includes a coarse adjustment 52 and a fine adjustment 54. In the present aspect, coarse adjustment 52 is configured as a two-pronged member having a distal end configured with a plurality of apertures 56 for receiving a cross pin 58 which attaches the coarse adjustment to the divider support 34. As such, the adjustment assembly can be adjusted via the coarse adjustment by movement of the cross pin within the various apertures 56 formed along the length of the coarse adjustment prong members. The proximal end of the coarse adjustment 52 is slidingly connected to the fine adjustment 54 e.g., via threads, such that the overall length of the adjustment assembly 36 can be adjusted to a desired length.

While the present aspect is disclosed as connecting the fine adjustment and coarse adjustment via threads, the foregoing can alternatively be connected for example, and not by way of limitation, as a ratcheting mechanism, pin and slot assembly, and the like. The coarse adjustment can also alternatively be configured with any other mechanism to allow coarse adjustments in positioning the divider relative to the head, such as, but not limited to a single prong member with apertures, a ratcheting mechanism, a linkage assembly, a gear assembly and the like. Generally, the fine adjustment allows for minor movement or minor displacement of the divider while the coarse adjustment allows for movement or displacement of the divider to a greater extent than that provided by the fine adjustment. Further, the foregoing adjustment assembly can alternatively be configured with any substantially or relatively fine adjustment or any substantially or relatively coarse adjustment suitable for the intended purpose and operation of the various aspects of the adjustment assembly of the subject application.

Moreover, the adjustor assembly can alternatively be configured with the fine and coarse adjustment formed as a unitary structure such that only the fine adjustment threads allow for movement of the adjustor assembly relative to the hood. In this case, the adjustor assembly can be configured without any coarse adjustment mechanism or the coarse adjustment can be configured on the divider support itself. For example, the divider support can be configured with an extension member having a pin and slot mechanism for attaching to the adjustor assembly.

In the present aspect, the fine adjustment 54 is configured as an elongated member having threads with an adjuster member 60 about its distal end. The adjuster member 60 is configured as a nut, but can alternatively be configured as any other adjustment member or turning member. The threads of the fine adjustment 54 is configured to mate with corresponding threads 62 on the coarse adjustment 52. The threads of the fine adjustment can be configured about its proximal end, opposite the distal end. While the length of displacement between the fine and coarse adjustment is illustrated with a male and female thread connection, the displacement mechanism can alternatively be configured as any other displacement mechanism suitable for the intended purpose e.g., a ratcheting mechanism, a gear mechanism and the like. The fine adjustment 54 is also configured so as to pass completely through the through hole 30 of the hood.

Rotation of the fine adjustment either increases or decreases the overall length of the adjuster assembly such that the overall position of the divider moves upwards or downwards relative to a fixed position of the divider support. The adjuster member 60 can be turned either manually or with a tool or an adapter tool such as a crank shaft.

In general, the adjustment assembly 36 is connected to the divider support or support structure and extends through the hood to a position above an outer surface of the hood for moving the divider 14 between first and second positions. While the present aspect of the subject application is disclosed substantially as a bolt, the fine adjustment can alternatively be configured in any other manner sufficient to allow relatively minor movement relative to a fixed body.

Figure 2:
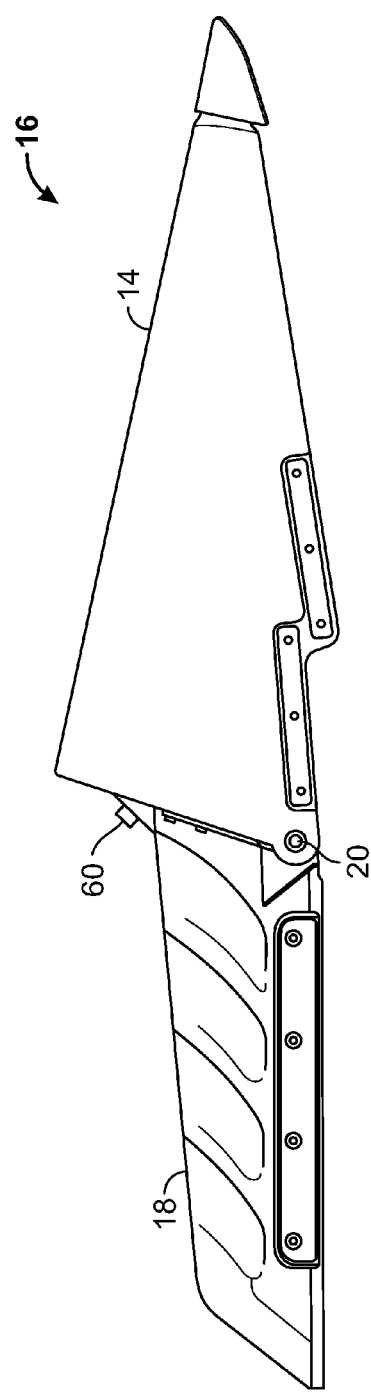
FIG. 2 is a side elevation view of a row divider of a corn header in accordance with the subject application.
Figure 5:
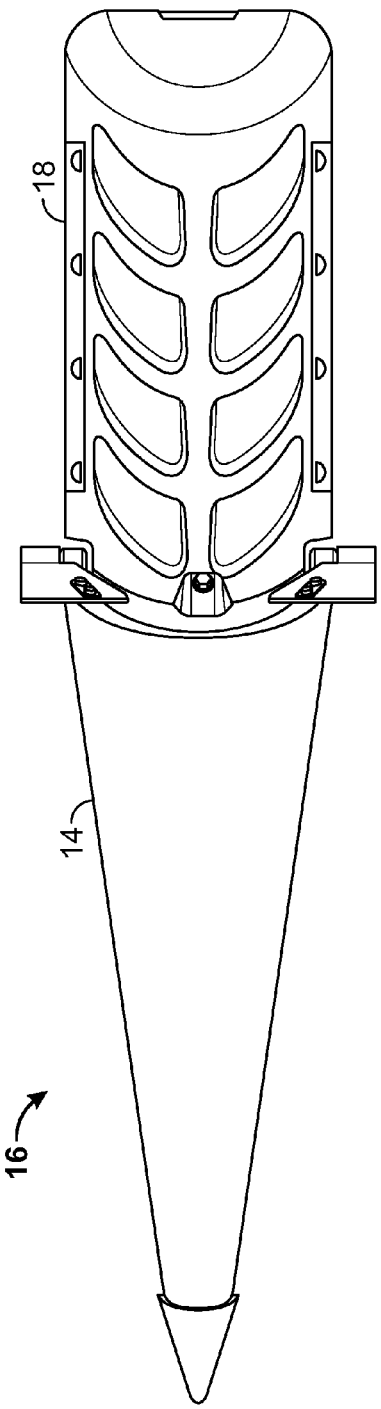
FIG. 5 is a top plan view of the row divider of FIG. 2.
Figure 3:
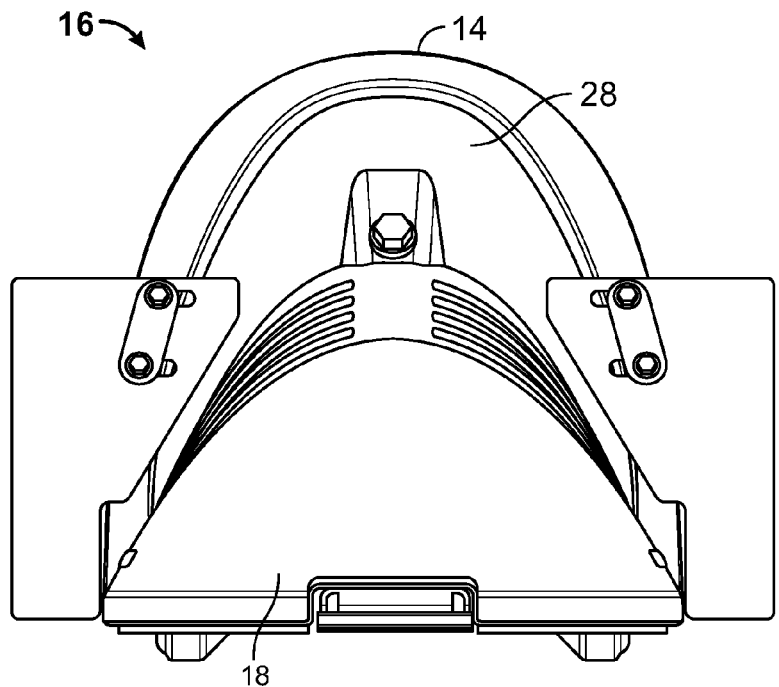
FIG. 3 is a rear elevation view of the row divider of FIG. 2.
Figure 4:
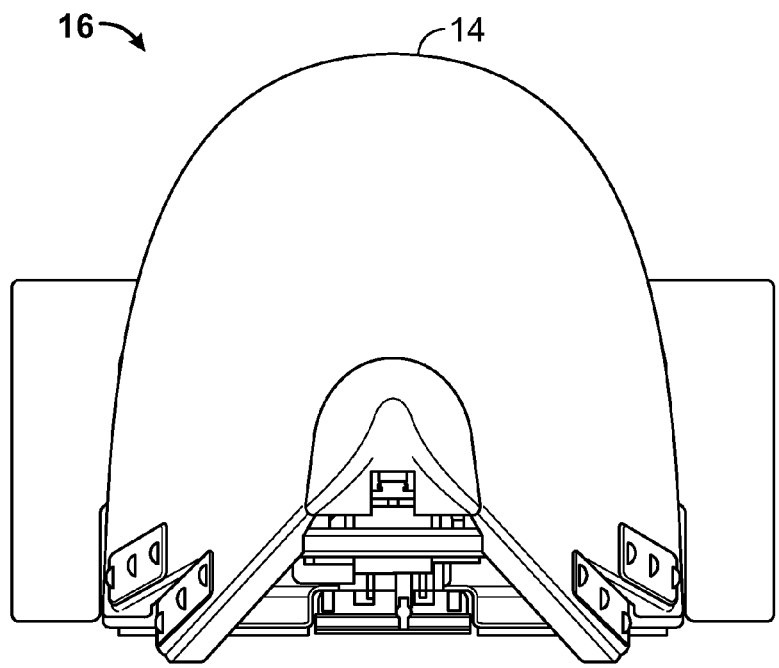
FIG. 4 is a front elevation view of the row divider of FIG. 2.

When fully assembled to the row divider 16, the fine adjustment 54 extends proud of an outer surface of the hood, as best shown in FIGS. 2, 3 and 6. Specifically, the adjustment assembly 36 extends through the hood 18 about a forward end of the hood. More specifically, the adjuster member 60 of the fine adjustment is positioned above an outer surface of the hood. In other words, the adjustment assembly 36 extends through the forward end 28 of the hood at a position spaced from a top surface 26 of the main body portion 24. Of course, the adjustment assembly can alternatively extend through the main body portion such that it terminates about a top surface thereof or directly on the top surface of the main body portion.

As such, the adjustment assembly 36 is adjustable from an outer region above the hood 18. That is, an operator of the agricultural harvester 10 can access and adjust the position of the divider relative to the hood via the adjustment assembly from a position about the outer surface of the hood and divider i.e., without the need for lifting the divider to an up position.

In a further aspect, the subject application provides a method of adjusting a row divider of an agricultural harvester comprising the act of providing an adjustment apparatus for adjusting a position of the divider and a hood relative to each other. The adjustment apparatus includes a divider support e.g., extending from the hood, for supporting the divider and an adjustment assembly connected to the divider support. The method further includes the act of extending the adjustment assembly through the hood to an outer region of the hood and adjusting the adjustment assembly from about the outer region of the hood.

Figure 14:
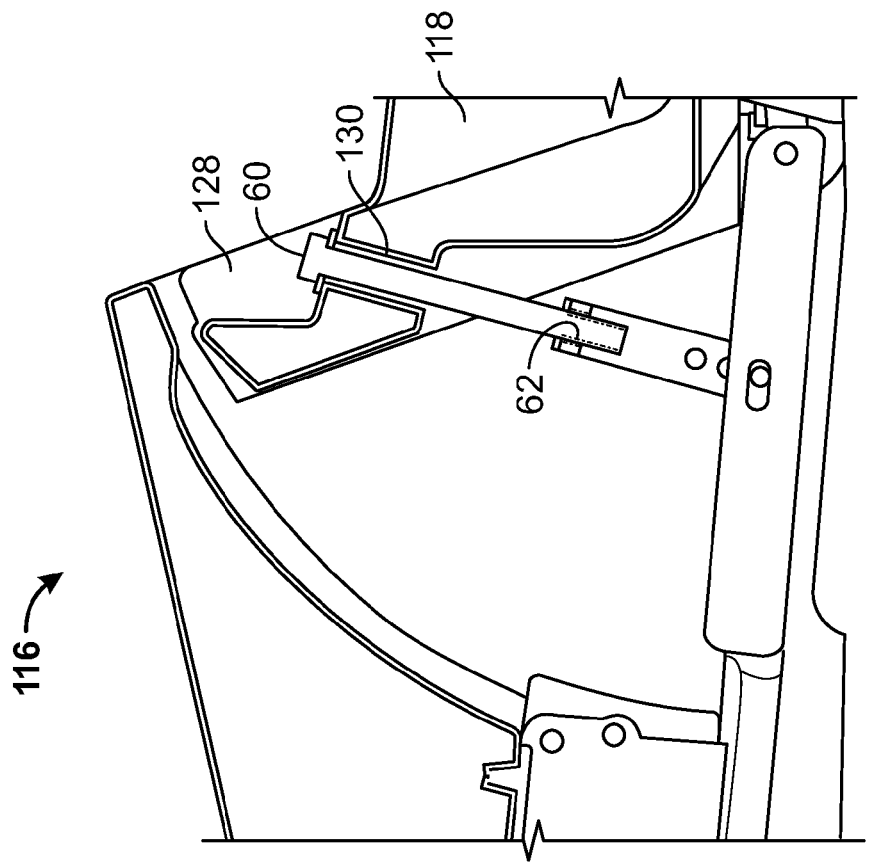
FIG. 14 is a partial side cross-sectional view of an adjustment apparatus of a row divider in accordance with another aspect of the subject application.

In yet a further aspect, the subject application provides a row divider 116, as shown in FIG. 14. Row divider 116 is substantially similar to row divider 16 described above except for the configuration of the hood 118. The hood 118 differs from hood 18 in its configuration and placement of through hole 130. Specifically, through hole 130 is configured to extend completely through the hood 118 about its front end 128, as shown in FIG. 14. Additionally, when the adjustment apparatus 32 is assembled to the hood 118, the adjuster member 60 is situated within a boundary defined by an outer perimeter of the front end 128 while still being accessible to an operator from an outside region of the hood.

It will be appreciated by those skilled in the art that changes could be made to the embodiments described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A row divider of an agricultural harvester comprising:
a hood;
a divider;
and an adjustment apparatus for adjusting a position of the divider and hood relative to each other, the adjustment apparatus including:
a divider support connected to the hood and supporting the divider, and
an adjustment assembly connected to the divider support and extending through the hood to an outer region of the hood.

2. The row divider of claim 1, wherein the adjustment assembly comprises an adjustment extending proud of an outer surface of the hood.

3. The row divider of claim 1, wherein the adjustment assembly comprises:
a coarse adjustment; and
a fine adjustment extending proud of an outer surface of the hood.

4. The row divider of claim 3, wherein the fine adjustment includes threads for mating with corresponding threads on the coarse adjustment.

5. The row divider of claim 3, wherein the fine adjustment includes an adjuster member positioned above an outer surface of the hood.

6. The row divider of claim 3, wherein the hood comprises a through hole for receiving the fine adjustment.

7. The row divider of claim 1, wherein the hood comprises a through hole for receiving a portion of the adjustment assembly.

8. The row divider of claim 7, wherein the through hole extends from a top end of the hood and completely through a forward end of the hood.

9. The row divider of claim 1, wherein the adjustment assembly is configured to be adjustable from an outer region above the hood.

10. The row divider of claim 1, wherein the adjustment assembly extends through the hood about a forward end of the hood.

11. The row divider of claim 1, wherein the hood includes a main body portion having a top surface and a forward end, and wherein the adjustment assembly extends through the forward end of the hood at a position spaced from the top surface of the main body portion.

12. A row divider of an agricultural harvester comprising:
a support structure connected to and extending from a hood and supporting a divider pivotably attached to the hood; and
an adjustment assembly connected to the support structure and extending through the hood to a position about an outer surface of the hood for moving the divider between first and second positions.

13. The row divider of claim 12, wherein the adjustment assembly comprises:
a course adjustment;
a fine adjustment extending proud of the outer surface of the hood.

14. The row divider of claim 13, wherein the adjustment assembly further comprises an adjuster member positioned above the outer surface of the hood for adjusting the fine adjustment.

15. The row divider of claim 13, wherein the fine adjustment includes threads for mating with corresponding threads on the coarse adjustment.

16. The row divider of claim 12, wherein the adjustment assembly extends through the hood about a forward end of the hood.

17. The row divider of claim 12, wherein the hood includes a main body portion having a top surface and a forward end, and wherein the adjustment assembly extends through the forward end of the hood at a position spaced from the top surface of the main body portion.

18. The row divider of claim 12, wherein the hood includes a through hole extending from an upper end of the hood to a forward facing end of the hood.

19. The row divider of claim 12, further comprising a snout attached to a front end of the divider.

20. A method of adjusting a row divider of an agricultural harvester comprising:
providing an adjustment apparatus for adjusting a position of a divider and a hood relative to each other, the adjustment apparatus including:
a divider support connected to the hood and supporting the divider, and
an adjustment assembly connected to the divider support and extending through the hood to an outer region of the hood,
the adjustment assembly comprising a coarse adjustment and a fine adjustment; and
adjusting the adjustment assembly from about the outer region of the hood.

* * * * *